H. B. HOLLIFIELD.
ATTACHMENT FOR MOTOR VEHICLES.
APPLICATION FILED JUNE 23, 1919.
1,395,111.
Patented Oct. 25, 1921.
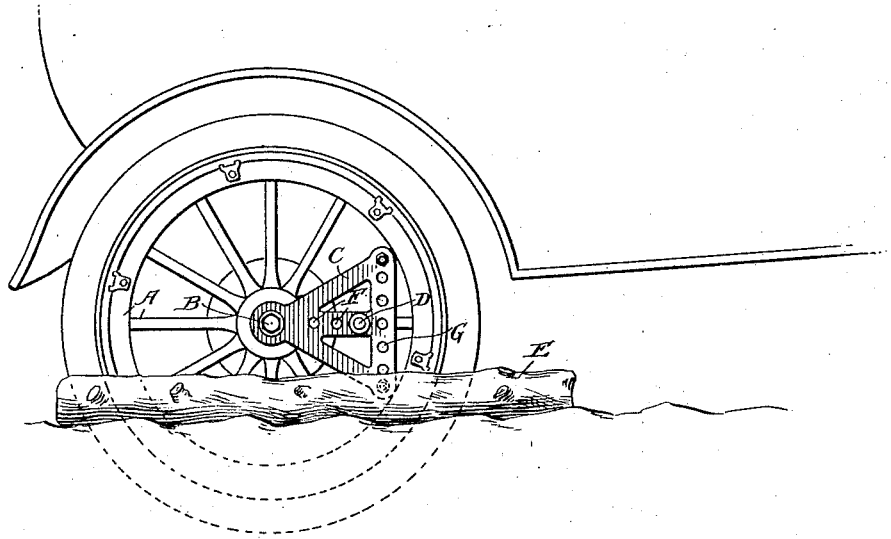
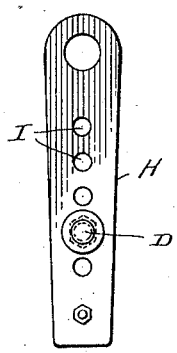
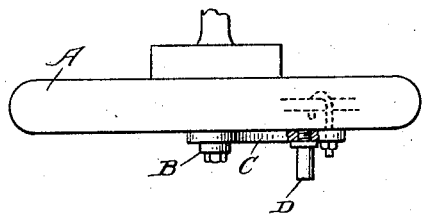

UNITED STATES PATENT OFFICE.

HORATIO B. HOLLIFIELD, OF WASHINGTON, DISTRICT OF COLUMBIA.

ATTACHMENT FOR MOTOR-VEHICLES.

1,395,111.  Specification of Letters Patent.  Patented Oct. 25, 1921.

Application filed June 23, 1919. Serial No. 306,103.

*To all whom it may concern:*

Be it known that I, HORATIO B. HOLLIFIELD, a citizen of the United States, and resident of Washington, in the District of Columbia, have invented certain new and useful Improvements in Attachments for Motor-Vehicles, of which the following is a specification, reference being had therein to the accompanying drawing.

The object of this invention is to provide devices whereby a motor vehicle having a driven wheel sunk in mud or sand and so rotating without advance, may be advanced by its own power.

This end is attained by placing alongside the sunken wheel a bar resisting depression and providing the wheel with an eccentric lateral projection in such position that when the wheel is rotated the projection moves down again said bar and lifts and advances the wheel, this being repeated with each rotation of the wheel.

In the accompanying drawings,

Figure 1 is a side view showing one driven wheel of a motor vehicle provided with my devices, a bar resisting depression being in place for coacting with those devices.

Fig. 2 nearly a plan view of the devices of Fig. 1.

Fig. 3 shows a modified form of a plate carrying the lateral projection.

While detachable projections are shown, detachability is not indispensable, and while the projection is borne by a device secured to the wheel instead of carried directly by the wheel, this is not essential to operativeness.

In the figures, A represents a driven wheel having, as usual, an axle at the center B. C designates a preferably triangular plane metal plate or frame having two angles clamped in any suitable way to the felly, or spokes near the felly, and the third angle supported at the wheel's center. At a point betwen said center and felly, a member D projects perpendicularly from the plate C or plane of the wheel. In a vertical plane parallel to the wheel and passing through the projection a bar E, of suitable length, adapted to resist downward force tending to flex it, is placed on or in the yielding earth as shown. This bar may be a log, scantling, rail, or a suitable bar, preferably not integrally continuous, carried by the machine for use when needed.

If the wheel be so turned that the projection D is above the surface of the earth, and if the rigid bar E be placed in position, and preferably pressed downward with some force, the forward rotation of the wheel carries the projection D down upon the bar E, and this, if properly arranged, will sink but little and so the wheel will be lifted and advanced, the projection remaining at substantially the same point upon the bar, until, the axle having passed to the front of the projection, the earth again supports the wheel in its advanced position. A second rotation of the wheel repeats the advance in the same way, and so on until the wheel is on solid earth.

It is to be noted that the plate C is nearly a convenient device for securing the projection to any ordinary wheel whether the spokes or felly be of metal or wood and even where a continuous metal web takes the place of spokes. In the latter case, it would probably be preferable to omit the plate C and attach the projection directly to the wheel. I have shown the plate as having both a radial line of holes F and a non-radial line of holes G along which the projection may be adjusted to vary its distance from the center, and in which it may be fixed by devices known to all mechanics.

By this variation in distance from the center, the projection may be set for proper engagement with bars of different sizes, or bars at such distance from the center as the nature of the hard or soft ground may determine in a particular instance.

Instead of the triangular plate a straight radial or diametrical bar H may be secured at the felly and center and a projection D is adjustable along a line of holes I in said bar.

The device is extremely simple and adapted to be secured quickly to any ordinary wheel and to advance the wheel by a series of vaulting steps when the motor rotates the wheel, and it has the further advantage that the rigid weight supporting bar may be at any convenient distance below the axle, as it could not were a small non-eccentric wheel used.

What I claim is:

1. A ground-engaging motor vehicle wheel having between its center and periphery a projection extending laterally beyond its outer face, adjustable in distance from the wheel's center and adapted to strike, as the wheel is forcibly rotated, an unattached bar laid upon the ground in the plane of said projection and less distant than the projection from the wheel's center.

2. The combination with a driven ground wheel of a motor vehicle, of a rigid plate-like member fixed to the outer side of the wheel at one side of the center, and a rigid stud projecting outwardly from said member between the center and circumference of the wheel.

3. The combination with a driven ground-engaging wheel of a motor vehicle, of a rigid projection extending from one face of the wheel between its center and periphery and arranged to be rigidly fixed to the wheel at any of various distances from the center, whereby it may be set for engaging a bar upon the ground whatever the bar's distance, within limits, from the wheel's center.

In testimony whereof I hereunto affix my signature.

HORATIO B. HOLLIFIELD.